United States Patent
Shvodian et al.

(10) Patent No.: US 7,359,459 B2
(45) Date of Patent: *Apr. 15, 2008

(54) SYSTEM AND METHOD FOR LOW POWER CLEAR CHANNEL ASSESSMENT

(75) Inventors: William M. Shvodian, McLean, VA (US); Richard D. Roberts, West Melbourne, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 700 days.

This patent is subject to a terminal disclaimer.

(21) Appl. No.: 10/873,422

(22) Filed: Jun. 23, 2004

(65) Prior Publication Data

US 2005/0036571 A1    Feb. 17, 2005

Related U.S. Application Data

(63) Continuation-in-part of application No. 10/623,804, filed on Jul. 22, 2003, which is a continuation-in-part of application No. 10/367,834, filed on Feb. 19, 2003.

(60) Provisional application No. 60/398,596, filed on Jul. 26, 2002, provisional application No. 60/397,105, filed on Jul. 22, 2002, provisional application No. 60/397,104, filed on Jul. 22, 2002, provisional application No. 60/480,442, filed on Jun. 23, 2002, provisional application No. 60/357,638, filed on Feb. 20, 2002.

(51) Int. Cl.
    *H04L 27/00* (2006.01)
(52) U.S. Cl. ............ 375/316; 375/338; 375/329; 375/235; 375/147; 375/150; 375/142; 375/343; 455/343.5; 455/574; 455/67.11

(58) Field of Classification Search ........... 375/338, 375/329, 235, 316, 147, 150, 142, 343; 455/343.5, 455/574, 67.11; 713/320, 321, 300, 323
See application file for complete search history.

(56) References Cited

U.S. PATENT DOCUMENTS 4,628,270 A    12/1986    Roberts (Continued)

OTHER PUBLICATIONS

Sklar, Bernard; "Digital Communications"; 1988; pp. 444, 445, 447, and 454.

(Continued)

*Primary Examiner*—Chieh M. Fan
*Assistant Examiner*—Aristocratis Fotakis

(57) ABSTRACT

A method is provided for performing a clear channel assessment in a local device. The local device receives signal energy in a wireless channel and splits the received signal energy into a real portion and an imaginary portion. It determines a real portion of a squared signal energy by subtracting a squared imaginary portion of the signal energy from a squared real portion of the signal energy, and determines an imaginary portion of the squared signal energy by calculating twice the product of the real and imaginary portions of the signal energy. It can perform a signal detection function on the real and imaginary portions of the squared signal energy to produce a clear channel assessment signal that indicates whether a set signal type is present in the wireless channel. This clear channel assessment signal can be used to determine whether the local device should remain in a low-power mode.

24 Claims, 4 Drawing Sheets

U.S. PATENT DOCUMENTS

| | | | | |
|---|---|---|---|---|
| 5,121,071 A | * | 6/1992 | Kelly et al. | 329/307 |
| 6,236,674 B1 | * | 5/2001 | Morelli et al. | 375/219 |
| 6,504,863 B1 | * | 1/2003 | Hellmark | 375/219 |
| 6,678,312 B1 | * | 1/2004 | Mohindra | 375/150 |
| 7,110,473 B2 | * | 9/2006 | Miller et al. | 375/316 |

OTHER PUBLICATIONS

Gardner, Floyd M., Ph.D; "Phaselock Techniques"; 1979; pp. 271-273.

* cited by examiner

SYSTEM AND METHOD FOR LOW POWER CLEAR CHANNEL ASSESSMENT

CROSS-REFERENCE TO RELATED PATENT DOCUMENTS

This application is a continuation-in-part of U.S. application Ser. No. 10/623,804, filed Jul. 22, 2003, entitled "METHOD FOR OPERATING MULTIPLE OVERLAPPING WIRELESS NETWORKS," which is a continuation-in-part of U.S. application Ser. No. 10/367,834, filed Feb. 19, 2003, entitled "M-ARY ORTHAGONAL CODED COMMUNICATIONS METHOD AND SYSTEM," which relies for priority on U.S. provisional application Ser. No. 60/357,638, by Matthew L. Welborn, filed Feb. 20, 2002, entitled "M-ARY BI ORTHAGONAL CODED ULTRAWIDEBAND COMMUNICATIONS SYSTEM," the contents of each of which are hereby incorporated by reference in their entirety. This application also relies for priority on U.S. provisional application Ser. No. 60/397,105, by Matthew L. Welborn et al., filed Jul. 22, 2002, entitled "M-ARY BIORTHAGONAL KEY BINARY PHASE SHIFT KEY SCHEME FOR ULTRAWIDE BANDWIDTH COMMUNICATIONS USING RANDOM OVERLAY CODES AND FREQUENCY OFFSET FOR PICONET SEPARATIQN," U.S. provisional application Ser. No. 60/397,104, by Richard D. Roberts, filed Jul. 22, 2002, entitled "METHOD AND APPARATUS FOR CARRIER DETECTION FOR CODE DIVISION MULTIPLE ACCESS ULTRAWIDE BANDWIDTH COMMUNICATIONS," and U.S. provisional application Ser. No. 60/398,596, by Richard D. Roberts, filed Jul. 26, 2002, entitled "METHOD AND SYSTEM OF ACQUIRING A BINARY PHASE SHIFT KEY ULTRAWIDE BANDWIDTH SIGNAL," the contents of all of which are hereby incorporated by reference in their entirety. This application also relies for priority on U.S. provisional application Ser. No. 60/480,442, by William M. Shvodian, filed Jun. 23, 2002, entitled "CLEAR CHANNEL ASSESSMENT FOR LOW POWER SCAN."

FIELD OF THE INVENTION

The present invention relates in general to wireless communication systems, such as ultrawide bandwidth (UWB) systems, including mobile transceivers, centralized transceivers, related equipment, and corresponding methods. Another aspect of the present invention relates to a wireless transceiver that can perform clear channel assessments in a low power mode, allowing it to monitor a channel without fully powering up. Another aspect of the present invention relates to a method and circuit for monitoring multiple channels to selectively determine when signals are being transmitted over one or more specific channels.

BACKGROUND OF THE INVENTION

When a device is part of a wireless network, it is generally necessary for the device to at least periodically listen to what is being transmitted over the wireless channel to determine if anything is intended for that device. In a situation with multiple channels, a device may limit its listening to one channel, or in some cases may listen to multiple channels.

It is also possible for wireless devices to have a low power mode (often called a sleep mode) in which a local device expects to send and receive no signals for a time and so shuts down to save power. However, in such a low power mode, it is often necessary for the local device to monitor one or more channels to determine whether any signals are being transmitted intended for the local device. Unfortunately, the receive mode is a particularly power-consumptive mode for many wireless devices. This is particularly true for some UWB devices where low powered signals are transmitted so that more power is needed to listen for the signals than it takes to transmit them.

This can significantly limit the effectiveness of the low power mode, by requiring the local device to continually power up its receiver in order to determine whether remote devices are directing transmissions its way.

The problems of power consumption can be exacerbated in situations where multiple channels are available and the local device is required to monitor two or more of these multiple channels. In this case the local device must keep its receiver powered up for an extended period of time to monitor several channels.

This can be particularly wasteful when there is no traffic at all on one or more channels. The local device must power up its receiver to monitor a channel over which no one is transmitting.

Accordingly, it would be desirable to provide a lower power way for a local device to monitor available channels that did not require powering up of a full receive circuit. It would also be desirable to provide a low power way for a local device to monitor multiple channels to determine whether there are transmissions over one or more of the channels.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

A wireless device has been proposed that includes clear channel assessment (CCA) circuitry that can monitor multiple channels in a wireless network. The CCA circuitry can determine whether signals are being sent over a given channel without fully receiving a signal on the channel. This will allow the device to remain in a low power mode for an increased amount of time and thus save on power consumption.

Network

Figure 1:
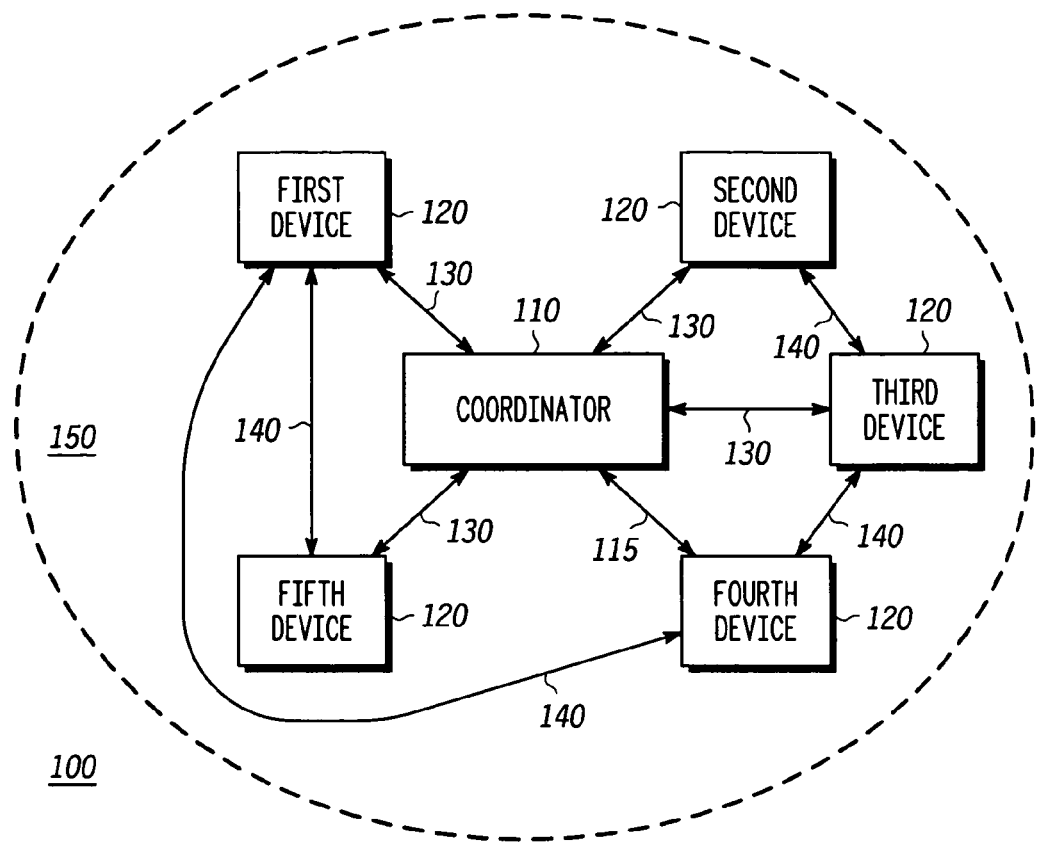
FIG. 1 is a block diagram of a wireless network according to a preferred embodiment of the present invention.

FIG. 1 is a block diagram of a wireless network according to a preferred embodiment of the present invention. In the disclosed embodiment, the network 100 is an ultrawide bandwidth (UWB) wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of non-coordinator devices 120. The coordinator 110 serves to control the operation of the network 100. As noted above, the system of coordinator 110 and non-coordinator devices 120 may be called a piconet, in which case the coordinator 110 may be referred to as a piconet coordinator (PNC). Each of the non-coordinator devices 120 must be connected to the coordinator 110 via primary wireless links 130, and may also be connected to one or more other non-coordinator devices 120 via secondary wireless links 140, also called peer-to-peer links.

In addition, although FIG. 1 shows bi-directional links between devices, they could also be unidirectional. In this case, each bi-directional link 130, 140 could be shown as two unidirectional links, the first going in one direction and the second going in the opposite direction.

In some embodiments the coordinator 110 may be the same sort of device as any of the non-coordinator devices 120, except with the additional functionality for coordinating the system, and the requirement that it communicate with every device 120 in the network 100. In other embodiments the coordinator 110 may be a separate designated control unit that does not function as one of the devices 120.

Through the course of the following disclosure the coordinator 110 will be considered to be a device just like the non-coordinator devices 120. However, alternate embodiments could use a dedicated coordinator 110. Furthermore, individual non-coordinator devices 120 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, or other personal wireless device.

The various non-coordinator devices 120 are confined to a usable physical area 150, which is set based on the extent to which the coordinator 110 can successfully communicate with each of the non-coordinator devices 120. Any non-coordinator device 120 that is able to communicate with the coordinator 110 (and vice versa) is within the usable area 150 of the network 100. As noted, however, it is not necessary for every non-coordinator device 120 in the network 100 to communicate with every other non-coordinator device 120.

Typically, the coordinator 110 and the non-coordinator devices 120 in a WPAN share the same bandwidth. Accordingly, the coordinator 110 coordinates the sharing of that bandwidth. Standards have been developed to establish protocols for sharing bandwidth in a wireless personal area network (WPAN) setting. For example, the IEEE standard 802.15.3.TM. provides a specification for a PHY layer and a MAC layer in such a setting where bandwidth is shared using a form of time division multiple access (TDMA). Using this standard, the MAC layer defines frames and superframes through which the sharing of the bandwidth by the devices 110, 120 is managed by the coordinator 110 and/or the non-coordinator devices 120. These superframes define how the available transmission time is split up among various tasks. Individual frames of information are then transferred within these superframes in accordance with the timing provided for in the superframe.

In the UWB system of FIG. 1, a series of wavelets (also called pulses) are sent across a transmission medium from a transmitting device. In order to carry data, these UWB wavelets need to have data encoded (i.e., modulated) into them. Then, a receiving device can look at the incoming pulses and decode the original data.

In a preferred embodiment, portions of an oscillating carrier signal are used as pulses, e.g., three repetitions of the oscillating signal. These portions of the oscillating signal could be modulated in a variety of ways, e.g., by different types of binary or ternary encoding, to form pulse streams in preferred embodiments of the present invention. When these sorts of signals are used in a BPSK system, they can be referred to as n-cycle BPSK.

Figure 2:
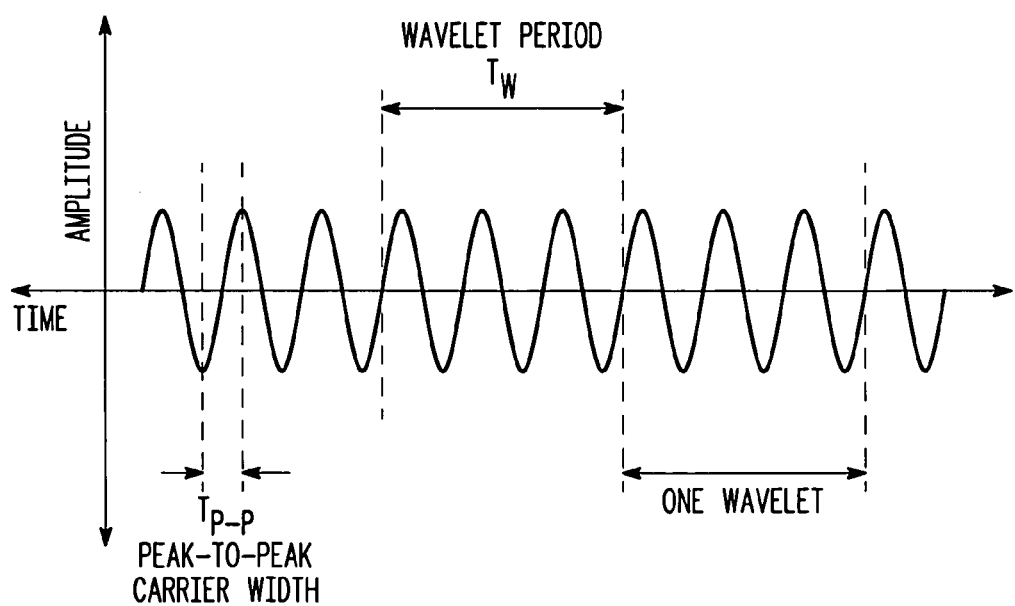
FIG. 2 is a graph of a three-cycle BPSK signal that uses three repetitions of a base oscillating signal as a UWB wavelet, according to a preferred embodiment of the present invention.

FIG. 2 is a graph of a three-cycle BPSK signal that uses three repetitions of a base oscillating signal as a UWB wavelet, according to a preferred embodiment of the present invention. In alternate embodiments other types of wavelets can be used, e.g., Gaussian monopulses.

As shown in FIG. 2, the carrier frequency of the oscillating signal (i.e., $1/T_{p-p}$) in the disclosed embodiment is three times the chipping rate. In other words, the frequency of the waveform of the oscillating signal is three times the frequency of the wavelets used by the network. This allows the network to take advantage of second order statistics that are unique to BPSK systems, and will allow improved acquisition.

This also means that it will be possible to recover the carrier frequency of BPSK sidebands by squaring the signal. And since the chipping frequency and the carrier frequency are related to each other, when you get the carrier frequency, you can easily calculate the chipping frequency.

Clear Channel Assessment (CCA)

In order to operate more efficiently, it is desirable that a wireless network be able to determine quickly whether or not a given channel is being used by another device. This is particularly useful in a carrier sense multiple access (CSMA) environment, though it can be helpful in any implementation where quick scanning is desirable. The individual channels that may be scanned are m-cycle BPSK channels (three-cycle BPSK in the disclosed embodiments) separated by frequency. This process can be called carrier sense or clear channel assessment.

In previous implementations, a full acquisition process was required to determine if a specific channel was clear (i.e., unused by another device) or not. However, an alternate approach allows for an assessment of whether the channel is clear to be performed quickly.

Figure 3:
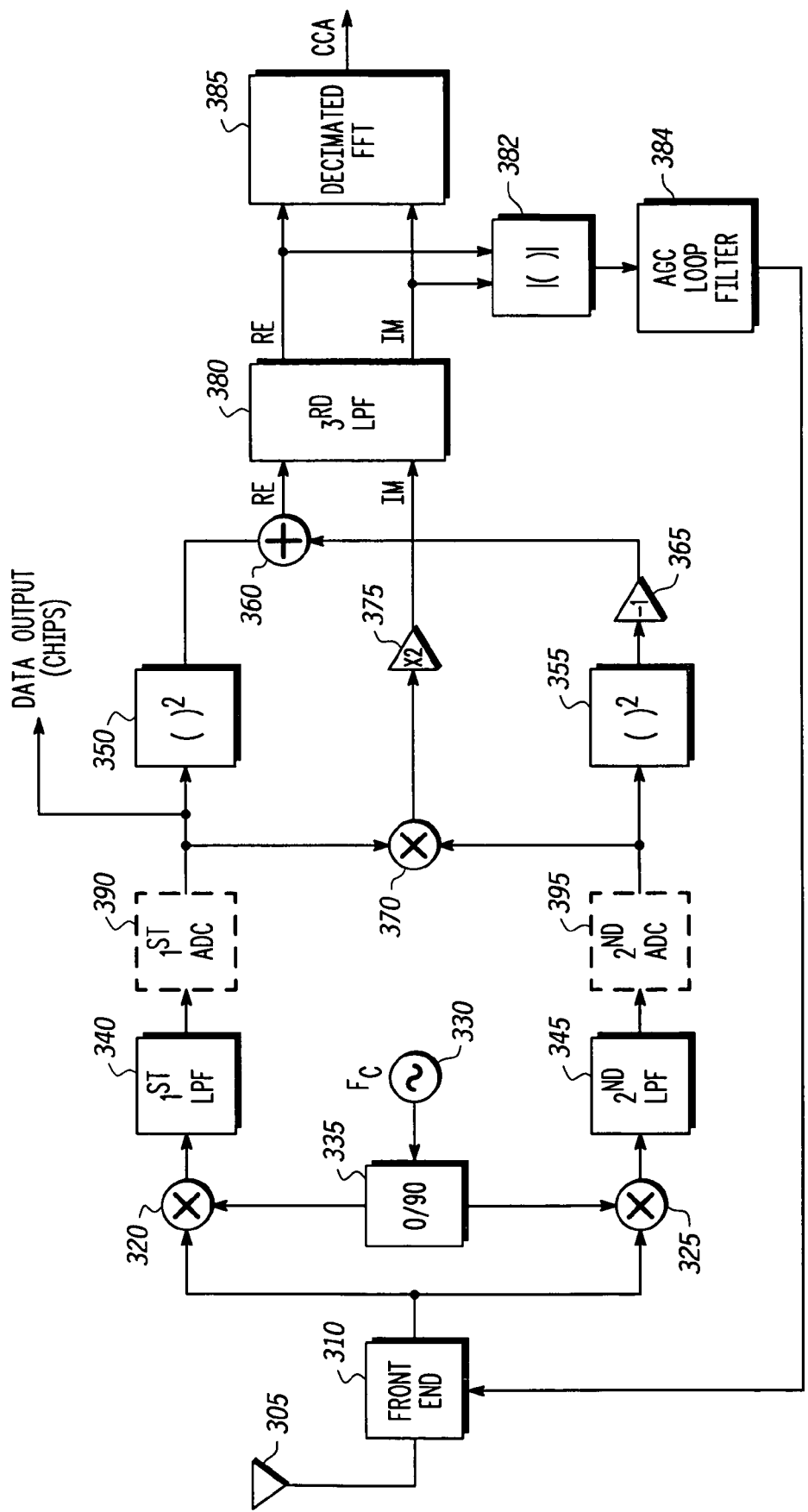
FIG. 3 is a block diagram showing a circuit for performing a rapid clear channel assessment according to a first preferred embodiment of the present invention.
Figure 4:
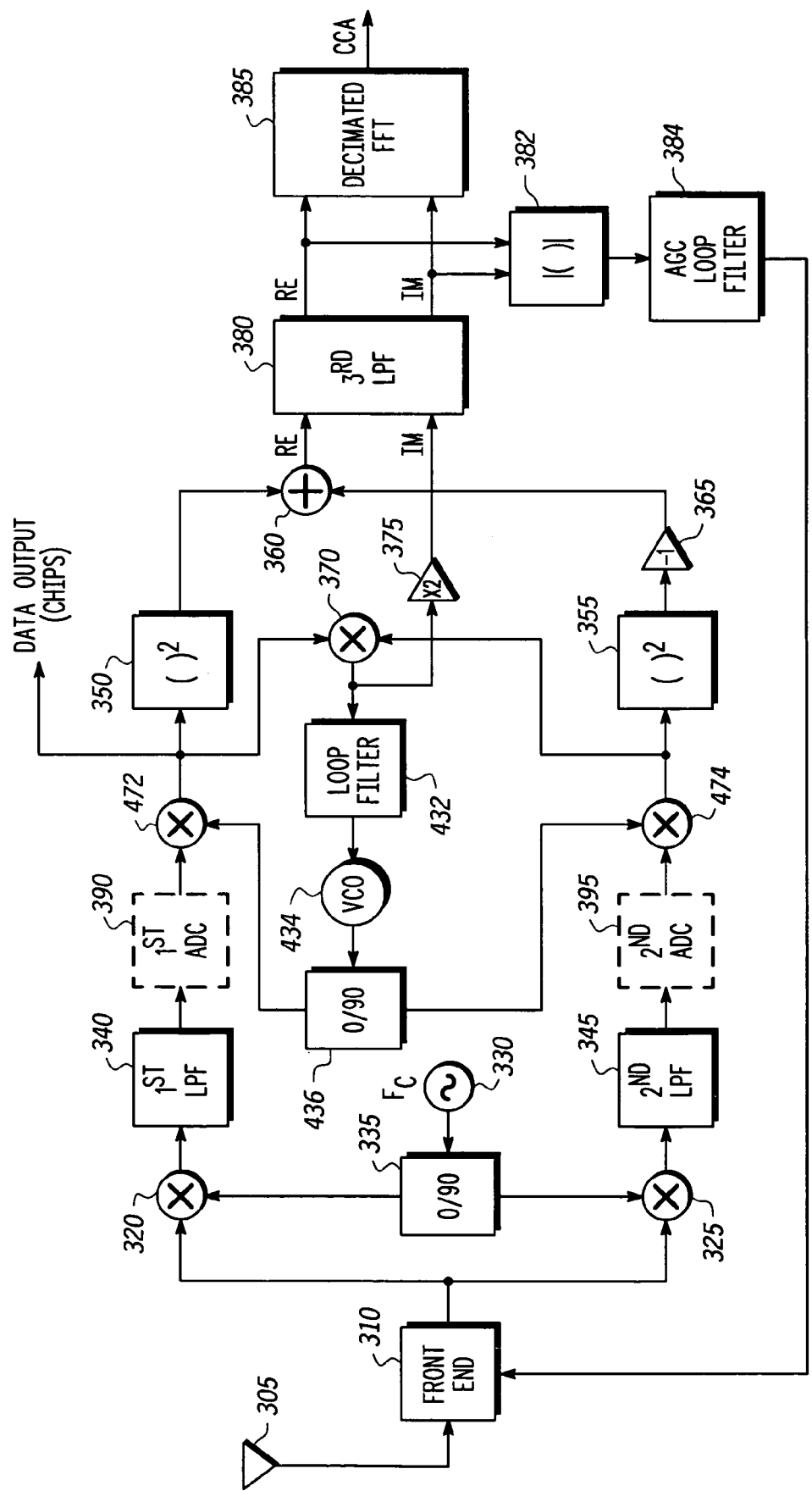
FIG. 4 is a block diagram showing a circuit for performing a rapid clear channel assessment according to a second preferred embodiment of the present invention.

FIGS. 3 and 4 are block diagrams showing circuits for performing a rapid clear channel assessment according to preferred embodiments of the present invention. In preferred embodiments these circuits preferably use segments of an oscillating signal as pulses. However, alternate embodiments could use different pulse structures.

First Preferred Embodiment of CCA Circuitry

As shown in FIG. 3, the clear channel assessment circuit 300 includes an antenna 305, an RF front end 310, a first mixer 320, a second mixer 325, a base oscillator 330, a 0/90 phase shifter 335, a first low pass filter (LPF) 340, a second LPF 345, a first squaring circuit 350, a second squaring circuit 355, an adder 360, an inverting buffer 365, a third mixer 370, a doubling buffer 375, a third LPF 380, an absolute value circuit 382, an automatic gain control (AGC) loop filter 384, and a decimated fast Fourier transform (FFT) 385.

Although this circuit may be implemented entirely using analog circuitry in some embodiments, in a preferred embodiment analog-to-digital converter (ADCs) are used at some point along the signal stream to allow part of the operation to be performed digitally. In a preferred embodiment, a first ADC 390 is placed between the first LPF 340 and the first squaring circuit 350, and a second ADC 395 is placed between the second LPF 345 and the second squaring circuit 355. However, in alternate embodiments, the number and placement of ADCs could be altered, or they could be eliminated altogether.

In operation, the clear channel assessment circuit 300 operates as follows. Signal energy comes in at the antenna 305. This can be an actual wireless signal, or just the ambient noise energy present in a given signal channel. For ease of disclosure, however, the incoming signal energy will be referred to as an incoming signal whether it is an actual signal or just ambient noise.

The incoming signal is sent through the front end 310, which preferably includes a variable gain amplifier controlled by feedback from the AGC loop filter 380. The front end 310 can also include a splitter to split the processed incoming signal into two paths. Once the incoming signal has been processed through the front end 310, it is provided to inputs in both the first and second mixers 320 and 325. These two mixers 320 and 325 mark the beginning of what can be called I and Q paths for the incoming signal, and this process of breaking the signal up into I and Q paths can be called I/Q demodulation.

The base oscillator 330 provides a base oscillating signal at a frequency of $F_c$. Preferably this base oscillating signal is a sinusoidal signal, though alternate waveforms can be used in alternate embodiments. $F_c$ is the center frequency of the particular bandwidth being used. In the preferred embodiment two bands are used, one centered on 4.104 GHz and the other centered on 8.208 GHz. Thus, if the circuit 300 is for the low band, $F_c$ is 4.104 GHz, and if the circuit 300 is for the high band, $F_c$ is 8.208 GHz. This can be varied in alternate embodiments.

The base oscillating signal output from the base oscillator 330 is sent through the 0/90 phase shifter, which outputs first and second oscillating signals that are out of phase from each other by 90 degrees. The first oscillating signal is provided to an input of the first mixer 320, and the second oscillating signal is provided to an input of the second mixer 325.

The phase difference between the first and second oscillating signals can be accomplished by allowing one copy of the base oscillating signal to pass unchanged, while another copy is shifted 90 degrees. Other embodiments could manipulate the base oscillating signal in other ways to provide the first and second oscillating signals. In the embodiment of FIG. 3, the first oscillating signal is the same phase as the base oscillating signal, while the second oscillating signal is delayed in phase by 90 degrees from the base oscillating signal. This could be altered in alternate embodiments, so long as the first and second oscillating signals were out of phase by 90 degrees.

The first mixer 320 mixes the first oscillating signal and the signal received from the front end 310 and provides a first mixed signal to the first LPF 340. Similarly, the second mixer 325 mixes the second oscillating signal and the signal received from the front end 310 and provides a second mixed signal to the second LPF 345.

The first and second LPFs 340 and 345 are preferably root raise cosine filters with a cutoff frequency proportional to the modulated signal, as is common for root raised cosine Nyquist filters. Other filter types and bandwidths can be used in alternate embodiments, however. In the preferred embodiment using high and low bands, the cutoff frequency used for the low band is 684 MHz, and the cutoff frequency used for the high band is 1.368 GHz. This can be modified in alternate embodiments.

The output of the first LPF 340 is provided to both the first squaring circuit 350 and the third mixer 370, while the output of the second LPF 345 is provided to both the second squaring circuit 355 and the third mixer 370.

The first squaring circuit 350 squares the output of the first LPF 340 to provide a first squared signal, while the second squaring circuit 355 squares the output of the second LPF 345 to provide a second squared signal.

The third mixer 370 mixes the output of the first LPF 340 and the output of the second LPF 345 to provide a third mixed signal.

The inverting buffer 365 inverts the second squared signal to provide an inverted signal, while the doubling buffer doubles the third mixed signal to provide a doubled signal.

The adder 360 adds the first squared signal, the inverted signal, and the doubled signal to produce an adder output signal.

One way to look at the clear channel assessment circuit 300 is to consider that it breaks the incoming signal into a real portion x output from the first LPF 340, and an imaginary portion y output from the second LPF 345. (These are sometimes referred to as I and Q paths.) The square of the incoming signal can also be calculated as the square of the sum of the real and imaginary portions of the incoming signal, as follows:

$$\text{Square of Incoming Signal} = (x + jy)^2 \qquad (1)$$
$$= x^2 + j2xy - y^2$$
$$= (x^2 - y^2) + j2xy$$

Thus, the output of the adder 360 represents the real portion of the square of the input signal, while the output of the doubling buffer 375 represents the imaginary portion of the input signal.

The third LPF 380 serves to remove double frequency components in the squared input signal. In the preferred embodiment the third LPF 380 has a cutoff frequency of 20 MHz.

The absolute value circuit 382 takes the output of the third LPF 380 and gives it a positive magnitude.

The ACG loop filter 380 is preferably a first order control loop filter with an output proportional to the error signal at the input. Other filter types are possible in alternate embodiments, however. The ACG loop filter 384 filters the output of the absolute value circuit 382 and provides the result to the front end 310 as a feedback signal.

The output of the third LPF filter 380 is also provided to the decimated FFT circuitry 385 as an input signal, which performs a decimated fast Fourier transform on the signal, moving the signal from the time domain to the frequency domain. The result of this decimated fast Fourier transform is a clear channel assessment (CCA) signal that indicates whether another network is on the air in the channel being listened to.

Although a decimated FFT function and associate circuitry is used to move the signal from the time domain to the frequency domain to determine the CCA, alternate embodiments can employ other methods and circuits. Any suitable method for pulling a sinusoidal signal out of noise would be acceptable. For example, an analog narrowband filter, a digital narrowband filter, or a model-based signal processing circuit could be used.

In operation, the current device compares the CCA against noise criteria to determine if another device is using the channel in question. If the CCA signal meets this criteria (e.g., is above a set threshold in preferred embodiments), then the device determines that the channel being investigated is in use; if the CCA signal does not meet the criteria (e.g., is not above a noise threshold in preferred embodiments), then the device determines that the channel being investigated is not in use. The noise baseline and associated thresholds can be determined by observation of unused channels, or by other known algorithms.

In a preferred embodiment, the clear channel assessment circuit 300 operates with analog circuitry up until the first and second LPFs 340 and 345, and operates with digital circuitry thereafter. Therefore, in this embodiment the first ADC 390 is inserted between the first LPF 340 and the first squaring circuit 350, and the second ADC 395 is inserted between the second LPF 345 and the second squaring circuit 355. In alternate embodiments the analog/digital line could be moved, or the whole operation could be performed in the analog realm.

This first preferred embodiment of the CCA circuitry requires that the base oscillator 330 be very accurate, which can require more complicated and expensive circuitry. Therefore, a second preferred embodiment is provided that allows for a feedback control of the frequency of the base oscillator 330.

Second Preferred Embodiment of CCA Circuitry

As shown in FIG. 4, the clear channel assessment circuit 400 includes an antenna 305, an RF front end 310, a first mixer 320, a second mixer 325, a base oscillator 330, a first 0/90 phase shifter 335, a loop filter 432, a voltage-controlled oscillator (VCO) 434, a second 0/90 phase shifter 436, a first low pass filter (LPF) 340, a second LPF 345, a first squaring circuit 350, a second squaring circuit 355, an adder 360, an inverting buffer 365, a third mixer 370, a fourth mixer 472, a fifth mixer 474, a doubling buffer 375, an automatic gain control (AGC) loop filter 380, and a decimated fast Fourier transform (FFT) 385. Elements in FIG. 4 that have the same reference numbers as in FIG. 3 operate in a similar manner.

As with the circuit of FIG. 3, although this circuit may be performed entirely using analog circuitry in some embodiments, in a preferred embodiment analog-to-digital converter (ADCs) can be used at some point along the signal stream to perform part of the operation digitally. In a preferred embodiment, a first ADC 390 is placed between the first LPF 340 and the first squaring circuit 350, and a second ADC 395 is placed between the second LPF 345 and the second squaring circuit 355. However, in alternate embodiments, the number and placement ADCs could be altered, or they could be eliminated altogether.

In operation, the clear channel assessment circuit 400 operates as follows. Signal energy comes in at the antenna 305. This signal energy can be an actual wireless signal, or just the ambient noise energy present in a given signal channel. For ease of disclosure, however, the incoming signal energy will be referred to as an incoming signal whether it is an actual signal or just ambient noise.

The incoming signal is sent through the front end 310, which preferably includes a variable gain amplifier controlled by feedback from the AGC loop filter 380. The front end 310 can also include a splitter to split the processed incoming signal into two paths. Once the incoming signal has been processed through the front end 310, it is provided to inputs in both the first and second mixers 320 and 325. These two mixers 320 and 325 mark the beginning of what can be called I and Q paths for the incoming signal, and this process of breaking the signal up into I and Q paths can be called I/Q demodulation.

The base oscillator 330 provides a base oscillating signal at a frequency of $F_c$. Preferably this base oscillating signal is a sinusoidal signal, though alternate waveforms can be used in alternate embodiments. $F_c$ is the center frequency of the particular bandwidth being used. In the preferred embodiment two bands are used, one centered on 4.104 GHz and the other centered on 8.208 GHz. Thus, if the circuit 300 is for the low band, $F_c$ is 4.104 GHz, and if the circuit 400 is for the high band, $F_c$ is 8.208 GHz. This can be varied in alternate embodiments.

The base oscillating signal output from the base oscillator 330 is sent through the first 0/90 phase shifter 335, which outputs first and second oscillating signals that are out of phase from each other by 90 degrees. The first oscillating signal is provided to an input of the first mixer 320, and the second oscillating signal is provided to an input of the second mixer 325.

The first 0/90 phase shifter 335 can achieve the phase difference between the first and second oscillating signals by allowing one copy of the base oscillating signal to pass unchanged, while another copy is shifted 90 degrees. However, other embodiments could manipulate the base oscillating signal in other ways to provide the first and second oscillating signals. In the embodiment of FIG. 4, the first oscillating signal is the same phase as the base oscillating signal, while the second oscillating signal is delayed in phase by 90 degrees from the base oscillating signal. This could be altered in alternate embodiments, so long as the first and second oscillating signals were out of phase by 90 degrees.

The first mixer 320 mixes the first oscillating signal and the signal received from the front end 310 and provides a first mixed signal to the first LPF 340. Similarly, the second mixer 325 mixes the second oscillating signal and the signal received from the front end 310 and provides a second mixed signal to the second LPF 345.

The first and second LPFs 340 and 345 are preferably root raise cosine filters with a cutoff frequency proportional to the modulated signal, as is common for root raised cosine Nyquist filtering. Other filter types and bandwidth can be used in alternate embodiments, however. In the preferred embodiment using high and low bands, the cutoff frequency used for the low band is 684 MHz, and the cutoff frequency used for the high band is 1.368 GHz. This can be modified in alternate embodiments.

The fourth mixer 472 receives the output of the first LPF 340 and a third oscillating signal received from the second 0/90 phase shifter 436, and mixes the two to provide a fourth mixed signal. The fifth mixer 474 receives the output of the second LPF 345 and a fourth oscillating signal received from the second 0/90 phase shifter 436, and mixes the two to provide a fifth mixed signal.

The first squaring circuit 350 squares the fourth mixed signal to provide a first squared signal, while the second squaring circuit 355 squares the fifth mixed signal to provide a second squared signal.

The third mixer 370 mixes the fourth and fifth mixed signals to provide a third mixed signal.

The loop filter 432 is preferably a type 2 second order lead-lag loop filter that serves to integrate the error signal from the third mixer 370, controlling the VCO 434.

The output of the loop filter 432 is then used to control the frequency of the VCO 434, which produces a corrective oscillating signal. This corrective oscillating signal is used to correct the frequency error introduced by the base oscillating signal produced by the base oscillator 330.

Preferably the VCO 434 has a frequency that is in the range of about 0 MHz to 10 MHz, depending upon the output of the loop filter 432.

The corrective oscillating signal output from the VCO 434 is sent through the second 0/90 phase shifter 436, which outputs third and fourth oscillating signals that are out of phase from each other by 90 degrees. The third oscillating signal is provided to an input of the fourth mixer 472, and the fourth oscillating signal is provided to an input of the fifth mixer 474.

The second 0/90 phase shifter 436 can achieve the phase difference between the third and fourth oscillating signals by allowing one copy of the corrective oscillating signal to pass unchanged, while another copy is shifted 90 degrees. However, other embodiments could manipulate the corrective oscillating signal in other ways to provide the third and fourth oscillating signals. In the embodiment of FIG. 4, the third oscillating signal is the same phase as the corrective oscillating signal, while the fourth oscillating signal is delayed in phase by 90 degrees from the corrective oscillating signal. This could be altered in alternate embodiments, so long as the third and fourth oscillating signals were out of phase by 90 degrees. The relative phases of the third and fourth oscillating with respect to the first and second oscillating signals is unimportant.

The inverting buffer 365 inverts the second squared signal to provide an inverted signal, while the doubling buffer doubles the third mixed signal to provide a doubled signal.

The adder 360 adds the first squared signal, the inverted signal, and the doubled signal to produce an adder output signal.

As noted above, one way to look at the clear channel assessment circuit 300 is to consider that it breaks the incoming signal into a real portion x output from the first LPF 340, and an imaginary portion y output from the second LPF 345 (i.e., I and Q paths). And based on Equation 1, the output of the adder 360 represents the real portion of the square of the input signal, while the output of the doubling buffer represents the imaginary portion of the input signal.

The third LPF 380 serves to remove double frequency components in the squared input signal. In the preferred embodiment the third LPF 380 has a cutoff frequency of 20 MHz.

The absolute value circuit 382 takes the output of the third LPF 380 and gives it a positive magnitude.

The ACG loop filter 380 is preferably a first order control loop filter with an output proportional to the error signal at the input. Other filters are possible, however, in alternate embodiments. The ACG loop filter 384 filters the output of the absolute value circuit 382 and provides the result to the front end 320 as a feedback signal.

The output of the third LPF filter 380 is also provided to the decimated FFT circuitry 385 as an input signal, which performs a decimated fast Fourier transform on the signal, moving the signal from the time domain to the frequency domain. The result of this decimated fast Fourier transform is a clear channel assessment (CCA) signal that indicates whether another network is on the air in the channel being listened to.

As noted above with respect to the first preferred embodiment, alternate circuits could be used in place of the decimated FFT circuitry 385. Possible alternatives include a digital narrowband filter, an analog narrowband filter, and model-based signal processing circuits.

The current device compares the CCA against noise criteria to determine if another device is using the channel in question. If the CCA signal meets the criteria (e.g., is above a set threshold in preferred embodiments), then the device determines that the channel being investigated is in use; if the CCA signal does not meet the criteria (e.g., is not above a noise threshold in preferred embodiments), then the device determines that the channel being investigated is not in use. The noise criteria can be determined by observation of unused channels, or by other known algorithms.

In a preferred embodiment, the clear channel assessment circuit 300 operates with analog circuitry up until the first and second LPFs 330 and 335, and operates with digital circuitry thereafter. Therefore, in this embodiment the first ADC 390 is inserted between the first LPF 330 and the first squaring circuit 340, and the second ADC 395 is inserted between the second LPF 335 and the second squaring circuit 345. In alternate embodiments the analog/digital line could be moved, or the whole operation could be performed in the analog realm.

Use of Frequency Offset

In transceiver embodiments that use segments of a continuously generated oscillating signal as wavelets (e.g., such as the signal shown in FIG. 2), it is possible to include a carrier offset to the code words used for multiple overlapping networks. In this case, a basic frequency used for the oscillating signal (sometimes called a carrier frequency) is offset for each of the networks by a unique offset value. Thus, a plurality of adjacent networks will each have nearly the same carrier frequency for its pulses, but none will be identical.

Tables 1 and 2 show examples of carrier offset values as they are used in preferred embodiments of the present invention. Table 1 shows an embodiment having seven overlapping networks, and is exemplary of embodiments having an odd number of overlapping networks. Table 2 shows an embodiment having four overlapping networks, and is exemplary of embodiments having an even number of overlapping networks. This carrier offset can work for any sort of pulse, whether a monopulse, a section of an oscillating signal, etc.

TABLE 1

Carrier Offset Values for
up to Seven Overlapping Networks

| Network Identifier | Carrier Offset Value |
|---|---|
| 0 | −9 MHz |
| 1 | −6 MHz |
| 2 | −3 MHz |
| 3 | Unchanged |
| 4 | +3 MHz |
| 5 | +6 MHz |
| 6 | +9 MHz |

As shown in Table 1, the carrier frequency (also called a center frequency) of each network is adjusted from the nominal carrier frequency by the appropriate carrier offset value. When an odd number of overlapping networks are provided for, one may use the nominal carrier frequency, while the remaining networks use an offset carrier frequency. Preferably the offset carrier frequencies are symmetrical around the nominal carrier frequency, although symmetry is not absolutely required.

TABLE 2

Carrier Offset Values for
up to Four Overlapping Networks

| Network Identifier | Carrier Offset Value |
|---|---|
| 0 | −9 MHz |
| 1 | −3 MHz |
| 2 | +3 MHz |
| 3 | +9 MHz |

As shown in Table 2, the carrier frequency of each network is adjusted from the nominal carrier frequency by the appropriate carrier offset value. When an even number of overlapping networks are provided for, preferably none of the networks use the nominal carrier frequency. Instead each network uses an offset carrier frequency. Preferably the offset carrier frequencies are symmetrical around the nominal carrier frequency, although symmetry is not absolutely required. Alternate embodiments can use a distribution of frequencies that are not symmetrical, including using the nominal carrier frequency.

Although Tables 1 and 2 show offset values for four and seven networks, more or fewer overlapping networks could be accommodated. Also, while in this embodiment the offset values are multiples of 3 MHz, in alternate embodiments the offset value could be changed. In some embodiments the offsets could use a different step value, or even have no set step value at all, varying from each other according to no set pattern. The practical limit of the offset values can be used is the tuning range of the oscillator used.

In one preferred embodiment two separate bands are used, a high band and a low band. The high band has a nominal carrier frequency of 8.208 GHz, and the low band has a nominal carrier frequency of 4.104 GHz.

In operation, the selection of the carrier offset value used by a given network will preferably be determined by the network's coordinator device 110 during the initial scan prior to initiating the network 100. In this case, the network coordinator 110 preferably selects a carrier offset value that is not in use by any other detected network 100 in the area. Preferably this will be done at the same time that the network coordinator 110 chooses a code word set for the network 100. In fact, the codeword set and the carrier offset will preferably be linked, each new network 100 choosing a linked set to use.

The use of the individual code words provides a degree of channel separation between overlapping networks during preamble acquisition, limited only by the cross-correlation properties of the code word set used by each network. The use of the carrier offset value supplements this separation by providing a degree of channel drift that keeps the channels used by each network from becoming stationary with respect to the other channels.

This is helpful because although the code words limit the number of conflicts between the signals of overlapping networks, they cannot eliminate them. If the center frequencies (i.e., carrier frequencies) used by each network were identical, then any conflicts between codes of overlapping networks would be fixed in time relative to each other.

However, if the two (or more) overlapping networks each have a slightly offset center frequency, the chipping phases of the networks will drift with time. This means that any significant interference between any two networks will fade away with time as the chipping phases of each network drift with respect to each other. And while the differing center frequencies also means that any interferences will also come back, their transitory nature means that they can often be corrected for through signal processing, e.g., through the use of forward error correction (FEC).

Therefore, in embodiments using pulses formed from segments of an oscillating signal, the use of a carrier offset can reduce the chance of continued interference between two overlapping networks, allowing any interference to be of limited duration and therefore potentially correctable.

Using chipping rate offsets between networks forces RMS cross-correlation conditions between network code words. Because of this, there is a required minimum frequency offset in order to insure that cross-correlation errors do not cause burst errors. For offsets less than the minimum, cross-correlation spikes can cause burst errors, which will require some sort of FEC capable of dealing with burst errors.

This makes it necessary to balance the increased costs of FEC operations to address burst errors with the costs of providing hardware complex enough to use frequency offsets adequate to guarantee single errors.

The following analysis will address the question of how much of a frequency offset is required between two networks to avoid burst errors.

Assuming that the symbol (code word) duration from two different sources will differ by an amount $\tau$; that is:

$$T_{S2} = T_{S1} + \tau, \quad (2)$$

the chipping rates of the first and second sources can be described as follows:

$$f_{C1} = \frac{N}{T_{S1}} \quad (3)$$

$$f_{C2} = \frac{N}{T_{S2}} = \frac{N}{T_{S1} + \tau} = \frac{N}{T_{S1}} \left\{ \frac{1}{1 + \frac{\tau}{T_{S1}}} \right\}. \quad (4)$$

where $f_{C1}$ is the chipping rate for the first source, $f_{C2}$ is the chipping rate for the second source, N is the code word length, $T_{S1}$ is the symbol duration of a first source, $T_{S2}$ is the symbol duration of a second source, and τ is the difference in symbol duration between the first and second sources.

Equation 4 can be expanded using a binomial series, and can be truncated to yield:

$$f_{C2} = \frac{N}{T_{S1}}\left[1 - \frac{\tau}{T_{S1}}\right] \quad (5)$$
$$= f_{C1}\left[1 - \frac{\tau}{T_{S1}}\right]$$
$$= f_{C1} - f_{C1} \cdot \frac{\tau}{T_{S1}}.$$

The offset frequency difference Δf can then be determined as:

$$\Delta f = f_{C1} - f_{C2} \quad (6)$$
$$= f_{C1} - \left(f_{C1} - f_{C1} \cdot \frac{\tau}{T_{S1}}\right)$$
$$= f_{C1} - f_{C1} + f_{C1} \cdot \frac{\tau}{T_{S1}}$$
$$= f_{C1} \cdot \frac{\tau}{T_{S1}}$$
$$= f_{C1} \cdot \frac{\tau}{\frac{N}{f_{C1}}}$$
$$= f_{C1}^2 \frac{\tau}{N}.$$

The values of N and $f_{C2}$ are determined by the network. The value of τ can be determined by the "time width" of the cross-correlation, which in turn is determined by the wavelet autocorrelation. It is therefore possible to determine what the required frequency difference Δf (i.e., the required offset frequency) is to decorrelate between two symbols and avoid burst errors.

In one preferred embodiment, N=24 (i.e., the code word is 24 chips long), and $f_{C1}$=2.736 Gcps (i.e., the chipping rate is 2.736 Gcps), and the autocorrelation 3 dB time width for 70 pS peak-to-peak wavelets is ±10 pS.

Using Equation 6, this results in a the following minimum frequency difference to decorrelate between two symbols:

$$\Delta f = \frac{10 \times 10^{-12}}{24}(2.736 \times 10^9)^2 \quad (7)$$
$$= 3.119 \text{ MHz} \approx 3.12 \text{ MHz}.$$

In other words, the frequency offset between chips must be about 3.12 MHz to decorrelate between two symbols. If the frequency offset is chosen to be 3.12 MHz or greater, then no burst errors will occur. If the frequency offset is chosen to be below 3.12 MHz, then burst errors will occur.

The length of burst errors will be determined by the chosen frequency offset. Using the parameters from Equation 6, consider if the offset frequency Δf were only 1 MHz. The difference in symbol duration between the first and second sources τ can be calculated as:

$$\tau = \frac{N \times \Delta f}{f_C^2} = \frac{24 \times 10^6}{(2.736 \times 10^9)^2} = 3.2 \text{ pS} \quad (8)$$

The error burst length can then be considered to be approximately the autocorrelation time width divided by difference in symbol duration between the first and second sources τ:

$$\text{Error Burst Length:} \approx \frac{20 \text{ pS}}{3.2 \text{ pS}} \approx 6 \quad (9)$$

The error burst length shows how long the error condition will persist before the offending code words drift apart in phase. This is determined by dividing the possible variation of the autocorrelation 3 dB time width (20 pS, given the ±10 pS range) by τ.

As noted above with respect to Table 2, in a preferred embodiment the frequency offsets for the chips are −9 MHz, −3 MHz, +3 MHz, and +9 MHz, which correspond to offsets of −3 MHz, −1 MHz, +1 MHz, and +3 MHz for the clock used to form the chips. This means that for two channels right next to each other, the frequency offset Δf will be 2 MHz, which gives a difference in symbol duration τ between devices on the two channels as:

$$\tau = \frac{N \times \Delta f}{f_C^2} = \frac{24 \times 2 \times 10^6}{(2.736 \times 10^9)^2} = 6.4 \text{ pS}, \quad (10)$$

with an error burst length of:

$$\text{Error Burst Length:} \approx \frac{20 \text{ pS}}{6.4 \text{ pS}} \approx 3, \quad (11)$$

which can be corrected through the use of FEC.

However, for two channels that are not adjacent, the frequency offset Δf will be 4 MHz or 6 MHz, which eliminates the risk of burst errors.

Therefore this implementation either eliminates burst errors or allows burst errors at a rate that can be addressed through the use of FEC. In the preferred embodiment, the coordinator of a network will preferably select and assign channels (i.e., frequency offsets) in such a way as to maximize the frequency offsets between the devices. In this way, the use of FEC will be used only when it cannot be avoided.

Clear Channel Determination

A multiple network environment can be modeled as a vector of signals $$V_s(t) = [S_{-3}(t)\ S_{-2}(t)\ S_{-1}(t)\ S_0(t)\ S_{+1}(t)\ S_{+2}(t)\ S_{+3}(t)] \quad (12)$$

where $S_i(t) = m_i(t) * \cos\{(\omega_0 + \omega_i)t\}$, $\omega_i$ is the frequency offset, and $m_i$ is the time dependent modulation. This vector will be processed by a square law device (e.g., the squaring circuits 350 and 355 in FIGS. 2 and 3).

The matrix product is given as of this squaring function is:

$$V_S^T(t) * V_S(t) = \begin{pmatrix} S_{-3}^2(t) & S_{-3}(t)S_{-2}(t) & S_{-3}(t)S_{-1}(t) & S_{-3}(t)S_0(t) & S_{-3}(t)S_{+1}(t) & S_{-3}(t)S_{+2}(t) & S_{-3}(t)S_{+3}(t) \\ S_{-2}(t)S_{-3}(t) & S_{-2}^2(t) & S_{-2}(t)S_{-1}(t) & S_{-2}(t)S_0(t) & S_{-2}(t)S_{+1}(t) & S_{-2}(t)S_{+2}(t) & S_{-2}(t)S_{+3}(t) \\ S_{-1}(t)S_{-3}(t) & S_{-1}(t)S_{-2}(t) & S_{-1}^2(t) & S_{-1}(t)S_0(t) & S_{-1}(t)S_{+1}(t) & S_{-1}(t)S_{+2}(t) & S_{-1}(t)S_{+3}(t) \\ S_0(t)S_{-3}(t) & S_0(t)S_{-2}(t) & S_0(t)S_{-1}(t) & S_0^2(t) & S_0(t)S_{+1}(t) & S_0(t)S_{+2}(t) & S_0(t)S_{+3}(t) \\ S_{+1}(t)S_{-3}(t) & S_{+1}(t)S_{-2}(t) & S_{+1}(t)S_{-1}(t) & S_{+1}(t)S_0(t) & S_{+1}^2(t) & S_{+1}(t)S_{+2}(t) & S_{+1}(t)S_{+3}(t) \\ S_{+2}(t)S_{-3}(t) & S_{+2}(t)S_{-2}(t) & S_{+2}(t)S_{-1}(t) & S_{+2}(t)S_0(t) & S_{+2}(t)S_{+1}(t) & S_{+2}^2(t) & S_{+2}(t)S_{+3}(t) \\ S_{+3}(t)S_{-3}(t) & S_{+3}(t)S_{-2}(t) & S_{+3}(t)S_{-1}(t) & S_{+3}(t)S_0(t) & S_{+3}(t)S_{+1}(t) & S_{+3}(t)S_{+2}(t) & S_{+3}^2(t) \end{pmatrix} \quad (13)$$

All the signals off the main diagonal represent the product of two uncorrelated spread spectrum signals which yields just another spread spectrum signal (represents an increase in the noise floor). However, the trace represents the square-law product sum of the signals $S_i^2(t)=m_i^2(t)*\cos^2\{(\omega_0+\omega_i)t\}$. The expectation of each double frequency term is given by $$\overline{S_i^2(t)} = \frac{1}{2} * \overline{m_i^2(t)} * \cos\{2(\omega_0 + \omega_i)t\} \quad (14)$$

where $\overline{m_i^2(t)} \approx 1$. This shows that the trace terms collapse to a double frequency component and the cross-product terms (off main diagonal terms) simply raise the noise floor. Assuming each network uses a unique chipping rate offset, the output of the squaring loop can be used for network identification.

The output of the squarer in FIG. 3 is a spectral comb representing the above trace terms with the noise floor set by the cross-product terms. This output is determined by the combination of the real and imaginary signal portions output from the third LPF 380, and provided to the decimate FFT 385.

Figure 5:
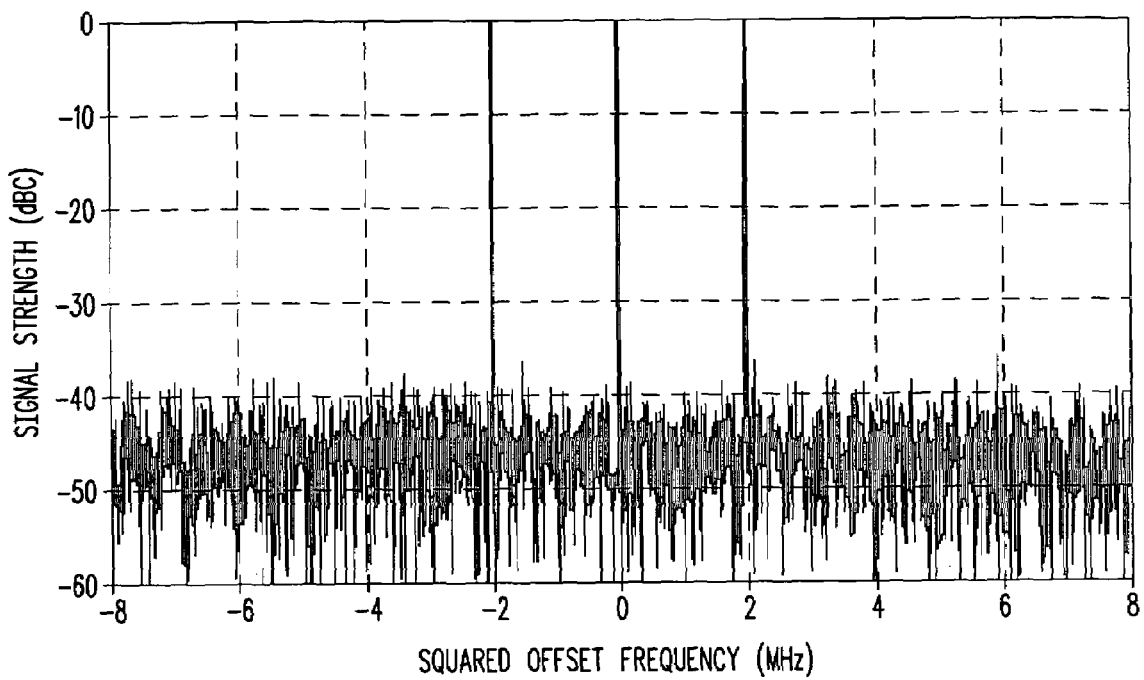
FIG. 5 is an FFT graph of a simulation of the output of the third low pass filter of FIG. 3 with three channels, according to a preferred embodiment of the present invention.
Figure 6:
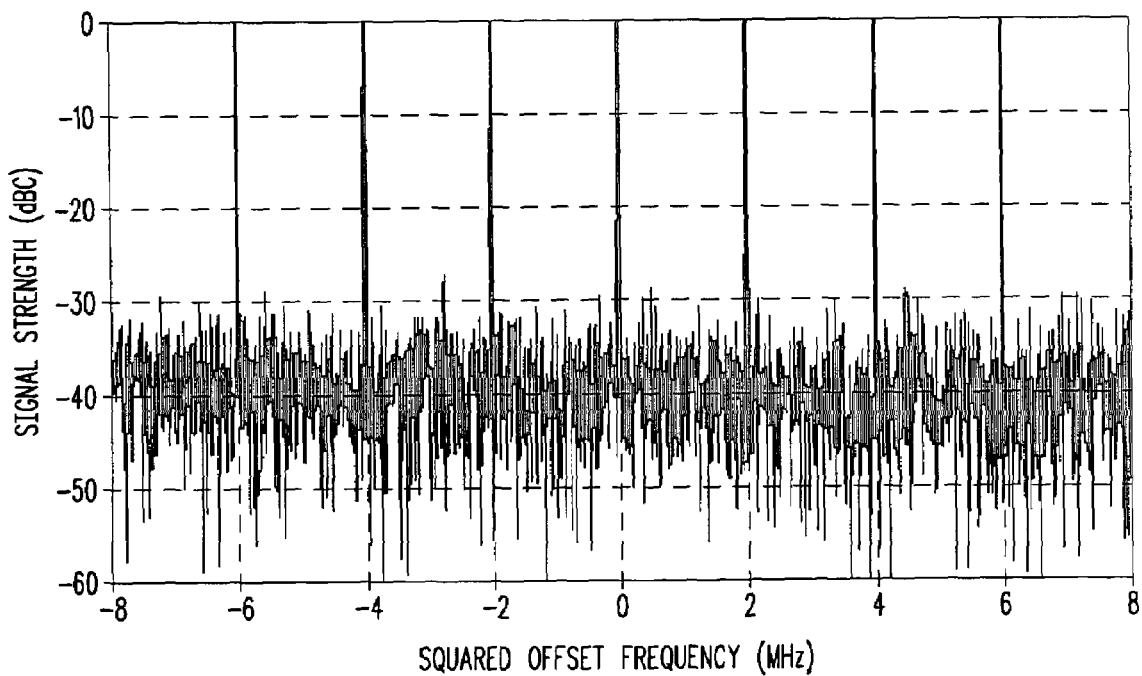
FIG. 6 is an FFT graph of a simulation of the output of the third low pass filter of FIG. 3 with seven channels, according to a preferred embodiment of the present invention.

FIGS. 5 and 6 are FFT graphs of a simulation of the output of the third LPF 380 of FIG. 4 with 3 terms and 7 terms (i.e., channels), respectively, according to a preferred embodiment of the present invention. In each simulation, the input signals were the same strength and the frequency offset was 1 MHz, which corresponds to a squared spectral line separation of 2 MHz.

In operation of the clear channel assessment circuit 300, the decimated FFT 385 (or whatever operates in place of that element in an alternate embodiment) performs an FFT analysis of the signals from the third LPF 380 as shown in FIGS. 5 and 6 to determine of there are any spikes in the signal strength of the incoming signal within a given frequency range. The decimated FFT 385 produces a single value as a result that can be used to determine if any channels within the given frequency range are in use.

When frequency offsets are used, each separate frequency channel shows up as a different signal strength spike at a different squared offset frequency. As a result, the decimated FFT 385 (or whatever operates in place of that element in an alternate embodiment) is preferably set to perform multiple operations over a number of frequency bands corresponding to each of the available offset frequency channels (i.e., the over a number of frequency bands corresponding to the possible locations of spikes). In this way, the decimated FFT 385 can producing a value for each channel that can be used to determine if that channel is in use. This multiple channel determination can be performed in series or in parallel in various embodiments.

In each case, if the signal output from the decimated FFT 385 (or alternate circuit element) for a given channel meets set signal criteria (e.g., is above a signal strength threshold in preferred embodiments), then the CCA circuit 300 determines that there is another device transmitting over that channel. If, however, the result output from the decimated FFT 385 does not meet the set signal criteria, (e.g., it is below the signal threshold in preferred embodiments), then the CCA circuit 300 determines that channel is unused.

As shown in FIGS. 5 and 6, each graph has a noise floor with a number of spikes corresponding to the number of terms used. And although the signal strengths were the same in both simulations, the noise floor in FIG. 6 is roughly 10 dB higher than the noise floor of FIG. 5.

Power Saving Operation

The use of the CCA circuits 300, 400 allows a wireless device to operate more efficiently with respect to power consumption. As noted above, in some UWB devices, a full receive mode can be one of the most power consumptive modes in the entire device. It would require a significant amount of power if the device had to wake up every time it needed to determine whether a particular channel was in use. In comparison, if just the CCA circuit 300, 400 were powered up, a device would consume much less power, comparatively.

For example, in some embodiments it may be desirable for devices that are in a sleep mode to periodically listen to one or more available channels to determine if there is wireless traffic being sent. It is much more preferable that such sleeping devices use a CCA circuit 300, 400 for CCA, keeping the majority of the receive circuitry unpowered until it is actually needed to receive a signal.

Furthermore, since the CCA circuitry 300, 400 can be used to determine not only when traffic is being sent over a wireless channel, but over what channel it is being sent (i.e., by identifying the frequencies in which a signal strength spike is present), the CCA circuitry can be used to monitor specific channels.

Thus, a sleeping device can maintain a low power mode while it continues to periodically monitor all available channels, or just one or more chosen from the available channels. If its CCA circuitry 300, 400 does not detect any signals, then the device can remain in its low power mode. If, however, the CCA circuitry 300, 400 detects a signal, then the device can power up its receive circuit to determine what message is being sent.

However, since it is possible that a long amount of time will pass between messages in some embodiments, this allows the sleeping device to maintain its low power mode for an extended period of time. This will serve to prolong battery life by only requiring powering up the full receiver when there is actually a signal being transmitted.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of performing a clear channel assessment in a local device on a wireless channel, comprising:
    receiving signal energy in the wireless channel;
    splitting the received signal energy into a real portion of the signal energy and an imaginary portion of the signal energy;
    squaring the real portion of the signal energy;
    squaring the imaginary portion of the signal energy;
    determining a real portion of a squared signal energy by subtracting the squared imaginary portion of the signal energy from the squared real portion of the signal energy;
    determining an imaginary portion of the squared signal energy by calculating twice the product of the real and imaginary portions of the signal energy;
    performing a signal detection function on the real and imaginary portions of the squared signal energy to produce a clear channel assessment signal that indicates whether a set signal type is present in the wireless channel.

2. A method of performing a clear channel assessment in a local device on a wireless channel, as recited in claim 1, wherein the step of splitting the received signal energy into a real portion of the signal energy and an imaginary portion of the signal energy further comprises:
    splitting the received signal energy into first and second signal paths;
    mixing the first signal path with a first oscillating signal to form the real portion of the signal energy; and
    mixing the second signal path with a second oscillating signal to form the imaginary portion of the signal energy,
    wherein the second oscillating signal is a copy of the first oscillating signal that is ninety degrees out of phase with the first oscillating signal.

3. A method of performing a clear channel assessment in a local device on a wireless channel, as recited in claim 1, further comprising:
    filtering the real portion of the signal energy with a first low pass filter prior to squaring the real portion of the signal energy; and
    filtering the imaginary portion of the signal energy with a second low pass filter prior to squaring the imaginary portion of the signal energy.

4. A method of performing a clear channel assessment in a local device on a wireless channel, as recited in claim 1, further comprising:
    performing a first analog-to-digital conversion on the real portion of the signal energy prior to squaring the real portion of the signal energy; and
    performing a second analog-to-digital conversion on the imaginary portion of the signal energy prior to squaring the imaginary portion of the signal energy.

5. A method of performing a clear channel assessment in a local device on a wireless channel, as recited in claim 1, further comprising:
    filtering both the real portion of a squared signal energy and the imaginary portion of a squared signal energy with a third low pass filter prior to performing the signal detection function.

6. A method of performing a clear channel assessment in a local device on a wireless channel, as recited in claim 1, wherein the signal detection function is one of: a decimated fast Fourier transform function, a decimated subspace projection function, an analog filtering function, and a digital filtering function.

7. A method of performing a clear channel assessment in a local device on a wireless channel, as recited in claim 1, wherein the wireless channel is defined by a frequency range around a center frequency of an oscillating carrier signal.

8. A method of performing a clear channel assessment in a local device on a wireless channel, as recited in claim 1, wherein the set signal type is an ultrawide bandwidth signal.

9. A method of performing a clear channel assessment in a local device on a wireless channel, as recited in claim 1, wherein the set signal type includes sinusoidal signals of one or more set frequencies.

10. A method of performing a clear channel assessment in a local device on a wireless channel, as recited in claim 1, wherein the clear channel assessment signal indicates that a set signal type is present in the wireless channel when the clear channel assessment signal strength rises above a noise threshold.

11. A method of performing a clear channel assessment in a local device on a wireless channel, as recited in claim 1, wherein the steps of receiving signal energy, splitting the received signal energy, squaring the real portion of the signal energy, squaring the imaginary portion of the signal energy, determining a real portion of a squared signal energy, determining an imaginary portion of the squared signal energy, and performing an extraction function are repeated over a plurality of frequency ranges in the wireless channel.

12. A method of performing a clear channel assessment in a local device on a wireless channel, as recited in claim 1, wherein the method is implemented in an integrated circuit.

13. A method of performing a clear channel assessment in a local device on a wireless channel, as recited in claim 1, wherein the method is implemented in an ultrawide bandwidth transceiver.

14. A method of performing a clear channel assessment in a local device on a wireless channel, as recited in claim 1, further comprising using the clear channel assessment signal to determine whether the local device should exit a power-saving mode.

15. A clear channel assessment circuit, comprising:
    an antenna for receiving signal energy in a wireless channel;

a splitting circuit for splitting the received signal energy into a real portion of the signal energy and an imaginary portion of the signal energy;

a first signal squaring circuit for squaring the real portion of the signal energy;

a second signal squaring circuit for squaring the imaginary portion of the signal energy;

a subtracting circuit for determining a real portion of the squared signal energy by subtracting the squared imaginary portion of the signal energy from the squared real portion of the signal energy;

a multiplying circuit for determining an imaginary portion of the squared signal energy by calculating twice the product of the real and imaginary portions of the signal energy; and a signal detection circuit for processing the real and imaginary portions of the squared signal energy to produce a clear channel assessment signal that indicates whether a set signal type is present in the wireless channel.

16. A clear channel assessment circuit, as recited in claim 15, wherein the splitting circuit further comprises:

a splitter for splitting the received signal energy into first and second signal paths;

a first mixer for mixing the first signal path with a first oscillating signal to form the real portion of the signal energy; and a second mixer for mixing the second signal path with a second oscillating signal to form the imaginary portion of the signal energy, wherein the second oscillating signal is a copy of the first oscillating signal that is ninety degrees out of phase with the first oscillating signal.

17. A clear channel assessment circuit, as recited in claim 15, further comprising:

a first filter located between the splitting circuit and the first signal squaring circuit; and a second filter located between the splitting circuit and the second signal squaring circuit.

18. A clear channel assessment circuit, as recited in claim 15, further comprising:

a first analog-to-digital converter located between the splitting circuit and the first signal squaring circuit; and a second analog-to-digital converter located between the splitting circuit and the second signal squaring circuit.

19. A clear channel assessment circuit, as recited in claim 15, further comprising a third filter located between both the subtracting and multiplying circuits and the signal detection circuit.

20. A clear channel assessment circuit, as recited in claim 15, wherein the signal detecting circuit is one of: a decimated fast Fourier transform circuit, a decimated subspace projection circuit, an analog filter, and a digital filter.

21. A clear channel assessment circuit, as recited in claim 15, wherein the wireless channel is defined by a frequency range around a center frequency of an oscillating carrier signal.

22. A clear channel assessment circuit, as recited in claim 15, wherein the set signal type is an ultrawide bandwidth signal.

23. A clear channel assessment circuit, as recited in claim 15, wherein the set signal type includes sinusoidal signals of one or more set frequencies.

24. A method of controlling power modes in a local device using a clear channel assessment signal, comprising:

entering the local device into a low power mode;

receiving signal energy at the local device in the wireless channel;

splitting the received signal energy into a real portion of the signal energy and an imaginary portion of the signal energy;

determining a real portion of a squared signal energy by subtracting a squared imaginary portion of the signal energy from a squared real portion of the signal energy;

determining an imaginary portion of the squared signal energy by calculating twice the product of the real and imaginary portions of the signal energy;

performing a signal detection function on the real and imaginary portions of the squared signal energy to produce a clear channel assessment signal that indicates whether a set signal type is present in the wireless channel; and moving the local device from the low power mode to a receive mode when the clear channel assessment signal indicates that the set signal type is present in the wireless channel.

* * * * *